W. H. CHAPMAN.
APPARATUS FOR NEUTRALIZING ELECTRICITY IN MOVING MATERIAL.
APPLICATION FILED NOV. 3, 1905.
940,428.
Patented Nov. 16, 1909.
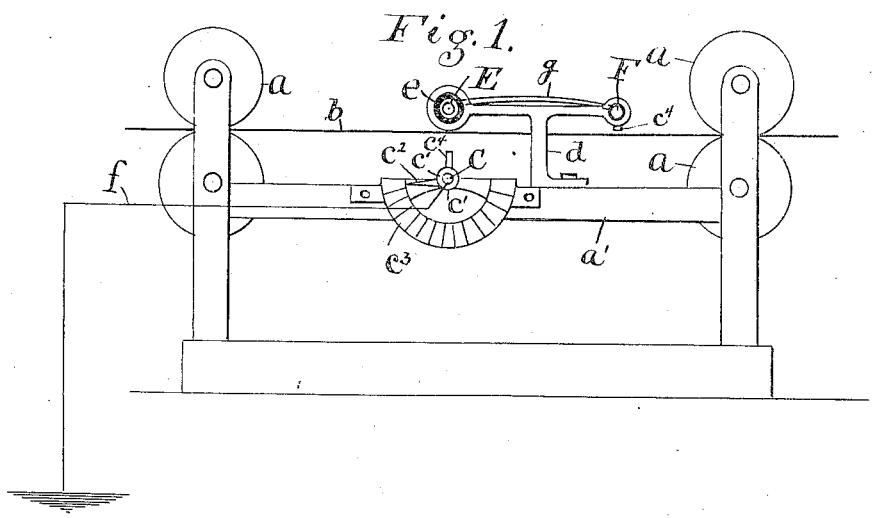
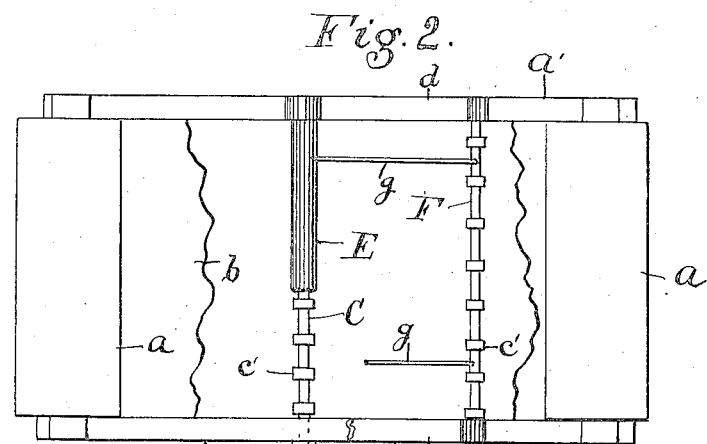
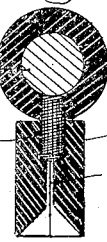
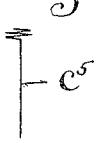
Witnesses:
Edith Hinckley
Mary Donaldson
Inventor:
William H. Chapman
by S. W. Bates
Atty.

UNITED STATES PATENT OFFICE.

WILLIAM H. CHAPMAN, OF PORTLAND, MAINE, ASSIGNOR TO CHAPMAN ELECTRIC NEUTRALIZER COMPANY, OF PORTLAND, MAINE, A CORPORATION OF MAINE.

APPARATUS FOR NEUTRALIZING ELECTRICITY IN MOVING MATERIAL.

940,428. Specification of Letters Patent. Patented Nov. 16, 1909.

Application filed November 3, 1905. Serial No. 285,677.

*To all whom it may concern:*

Be it known that I, WILLIAM H. CHAPMAN, a citizen of the United States of America, and a resident of Portland, Cumberland county, State of Maine, have invented certain new and useful Improvements in Apparatus for Neutralizing Electricity in Moving Material, of which the following is a specification.

My invention relates to an apparatus for neutralizing static electricity in paper and other material in motion and it relates particularly to an apparatus for neutralizing electricity in webs of paper, cloth or other material which passes continuously by a given point. Hitherto such electricity has been neutralized by applying to the paper or other material a charge of electricity of opposite sign from that contained in the material and in sufficient quantity to counteract all the electricity developed in the material and this in some cases involved the furnishing of considerable quantities of electricity. For instance, in a paper machine when the paper is 8 feet wide and is moving at the rate of 500 feet per minute the electric generating machine or the transformer must at least supply as much electricity as is contained in 4000 square feet of paper.

The object of my invention is first to greatly reduce the amount of electricity necessary to effect the neutralization and second, to utilize the electricity contained in the paper or other material, itself to do the neutralizing, or in other words, to make the static electricity developed in the material neutralize itself. I accomplish these objects by placing adjacent to the material a conductor having small surfaces or points, which for convenience I will call a "comb", from which electricity may be discharged onto the surface of the material to be treated, this conductor being connected with the earth, and placing adjacent to said conductor an insulated conductor having smooth surfaces to prevent radiation, said conductor being connected to a source of electricity of the same polarity as that contained in the paper, such source of electricity being preferably a comb conductor placed adjacent to the paper or other material so as to collect electricity therefrom. Thus a charge of electricity of opposite polarity to that in the material is induced in the comb and thence discharged onto the material, the insulated conductor losing little or none of its electricity in the operation. The insulated conductor may receive its electricity from a Wimshurst machine or other generator or it may be as stated, preferably collected from the material by a collecting comb placed ahead of and electrically connected with the insulated conductor.

It will be seen that by this apparatus the electricity which is actually employed to neutralize the material is drawn from the earth by induction to the discharging comb while the electricity furnished to the insulated conductor from the generator, transformer or from the material itself is not used or discharged and is limited in quantity. Again, as the apparatus is preferably constructed viz.;—when the electricity is taken from the material itself to charge the insulated conductor, I require the use of no generator, transformer or other expensive apparatus, the whole device necessary to carry out the process being compact, self contained and operated without expense.

I illustrate my invention by means of the accompanying drawing which shows a portion of paper or other like machine adapted to handle a continuous web of paper with my apparatus applied to it.

Figure 1 is a side elevation of the machine, Fig. 2 is a plan of the same, Fig. 3 is a section taken through the comb conductor and Fig. 4 is a detail of the wire discharging point used on said conductor.

$a'$ represents a suitable frame in which is journaled the calender or other like rolls through which passes the web of paper $b$ which is to be treated.

A charge of electricity of opposite polarity from that contained in the paper is applied to the paper by means of a comb conductor as C which may be located above or as here shown, below the web of paper. This conductor consists of a metal rod on which is located a series of insulated offsets detachably connected thereto containing fine wires for discharging the electricity onto the paper. As here shown, I use a series of collars $c'$ which slip on over the rod and are spaced along the rod at equal distances apart so the electricity discharged from each as hereafter described, will cover the entire surface of the paper above the rod. Each of the collars $c'$ is provided with one or more fine discharging points connected with the metal rod by which the electricity is radiated to the paper. As here shown, I provide for each collar a stud $c^4$ of insulating material secured to the collar by a nipple $c^6$, a screw threaded recess being formed in the end of the stud and in the side of the collar for this purpose. This nipple serves the double purpose of securing the stud to the collar and clamping the collar to the rod, the nipple acting as a metallic connection for connecting the rod with the wire $c^5$ which forms a terminal at the end of the stud. This wire extends through a small central perforation formed longitudinally in the stud which terminates in a flaring opening at the end of the stud. The inner end of the wire as here shown is coiled into a flat coil which is confined against the bottom of the screw threaded recess by the nipple $c^6$. Thus the nipple and the wire convey the charge to the end of the stud from which point it is radiated to the paper. The ends of the rods are supported in the frame in such a manner that the rod can be rotated, one of the ends being journaled in the segment $c^3$ and a pointer or arm is provided on the end of the rod by which its position is indicated on the segment.

The rod C is connected with the earth by the wire $f$ as shown. A charge of electricity of opposite polarity to that of the paper is induced in the comb conductor C by means of an insulated conductor E which has smooth surfaces and comparatively large area to prevent radiation of its charge into the air. This conductor is supported on the opposite side of the paper from the conductor C but adjacent thereto, by means of a supporting standard $d$ and it is insulated from said standard as at $e$. It is charged with electricity of the same polarity as that of the material which in the case of paper would be negative and this charge is preferably supplied by a collecting comb conductor F constructed the same as the conductor C but located at a point where the paper is still charged with negative electricity, that is, ahead of the point where the conductors C and E are applied. The conductor F is supported by the standard $d$ or in any other suitable manner and connected with the conductor E by wires $g$ or other metallic connection.

The operation of my apparatus is as follows:—The comb conductor F which has its collecting wires turned toward the paper, collects a charge of negative electricity from the paper and in turn charges the conductor E. A charge of positive is thus drawn from the earth by induction in the conductor C and discharged from the fine wire points onto the surface of the moving paper and neutralizes the charge of negative in the paper.

In order to be sure of getting just the right quantity of positive to neutralize all the negative of the paper it is important to place the conductor C in just the right position so that the wire points will radiate the right quantity to the paper. A convenient way of fixing the proper position of the points is by rotating the rod C until the studs are at just the right point to completely neutralize the charge of the paper. When the studs point directly toward the paper there will usually be an excess of positive discharged and the paper will pass along with a positive instead of a negative charge. When the studs are turned away from the paper the discharge will be insufficient to neutralize all the negative. The proper point is found by slowly revolving the rod C and noting the effect on an electrometer placed near the paper and noting the position of the arm $c^2$ on the segment. When the proper position of the arm on the segment is once determined it tends to remain constant whatever the charge in the paper may be, either great or small and the position may be easily changed by turning the arm $c^2$. Thus it will be seen that by the use of this apparatus the electricity of the paper is made to furnish the electricity to neutralize itself without the use of any external means.

If desired and under certain conditions a charge may be furnished to the conductor E of the same polarity as that of the paper from a suitable generator as a Wimshurst machine but even when this is done little electricity is used as the conductor E is insulated and does not tend to part with its charge, the charge that does the actual work of neutralizing being drawn from the earth.

Instead of the form of comb conductor here shown a fine wire may be used or any form of conductor having fine discharging points and more than a single wire may be located in each stud if desired.

The conductor C may be adjusted with relation to its distance from the surface of the paper otherwise than by rotating the points as here shown but this is a simple and convenient construction for the purpose. The collars may be of insulating material as shown but this is not necessary so long as the fine wire conductors are protected by proper insulation.

I claim;—

1. The herein described apparatus for neutralizing static electricity in moving material consisting of a comb conductor located adjacent to the moving material and connected with earth, an insulated conductor located adjacent to said comb conductor charged with electricity of the same polarity as that of the material to be treated.

2. The herein described apparatus for neutralizing static electricity in moving material consisting of a comb conductor located adjacent to the moving material and connected with earth, an insulated conductor for inducing a charge of electricity in said comb conductor and located on the opposite side of the moving material and means for charging said insulated conductor with electricity of the same polarity as that of the material to be treated.

3. The herein described apparatus for neutralizing static electricity in moving material consisting of a comb conductor located adjacent to the material and connected with earth, an insulated conductor adjacent to said comb conductor for inducing a charge of electricity therein, and a collecting comb conductor connected with said insulated conductor and located adjacent to the moving material at a point where it is charged with electricity.

4. The herein described apparatus for neutralizing static electricity in moving material consisting of a comb conductor located adjacent to the material and connected with earth, an insulated conductor adjacent to said comb conductor and on the opposite side of the moving material for inducing a charge of electricity in said comb conductor and a collecting comb conductor located adjacent to the material at a point where it is charged with electricity and connected with said insulated conductor.

5. The herein described apparatus for discharging electricity onto or collecting it from a body to be neutralized consisting of a metal rod, one or more collars on said rod each having a stud or projection of insulating material on one side thereof with a longitudinal opening extending through said stud to said rod and a metallic conductor extending from said rod through said opening and terminating in the end thereof with a fine point.

6. The herein described apparatus for discharging electricity onto or collecting it from a body to be neutralized consisting of a metallic rod, one or more collars on said rod, each having a screw threaded opening in one side, a stud of insulating material connected with each collar having a screw threaded opening, in one end, a nipple fitting said openings to secure said stud and collar together and to clamp said collar on the rod, said stud having a longitudinal perforation from its outer end to said opening and a wire extending through said longitudinal perforation from its outer end to said screw threaded opening and having its inner end in contact with said nipple.

7. The herein described apparatus for discharging electricity onto or collecting it from a body to be neutralized, consisting of a metallic rod having a series of independent insulating members removably secured thereto, each of said members having therein a discharging conductor terminating at its open end in a fine point and connecting with said rod.

8. The herein described apparatus for discharging electricity onto or collecting it from a body to be neutralized consisting of a metallic rod having a series of independent insulating members each extending at right angles to said rod and secured thereto and having therein a discharging conductor connected to said rod and terminating in a fine point at the open end of said insulated member.

Signed at Portland, Maine, this 27th day of October, 1905.

WILLIAM H. CHAPMAN.

Witnesses:
S. W. BATES,
MARY DONALDSON.